(12) United States Patent
Zabawskyj et al.

(10) Patent No.: US 7,873,347 B2
(45) Date of Patent: Jan. 18, 2011

(54) METHOD FOR IMPLEMENTING A WIRELESS LOCAL AREA NETWORK (WLAN) GATEWAY SYSTEM

(75) Inventors: Bohdan Konstantyn Zabawskyj, Woodbridge (CA); Daniel Peter Morel, Toronto (CA)

(73) Assignee: Redknee Inc., Mississauga (CA)

( * ) Notice: Subject to any disclaimer, the term of this patent is extended or adjusted under 35 U.S.C. 154(b) by 1214 days.

(21) Appl. No.: 10/603,099

(22) Filed: Jun. 19, 2003

(65) Prior Publication Data

US 2004/0258031 A1 Dec. 23, 2004

(51) Int. Cl.
*H04M 11/00* (2006.01)
*H04M 15/00* (2006.01)

(52) U.S. Cl. .................... 455/406; 455/408; 379/114.01

(58) Field of Classification Search ......... 455/405–411; 379/111–134, 144.01
See application file for complete search history.

(56) References Cited

U.S. PATENT DOCUMENTS

| | | | |
|---|---|---|---|
| 6,473,622 B1 | 10/2002 | Meuronen | |
| 6,615,262 B2 | 9/2003 | Schweitzer | |
| 6,621,793 B2 | 9/2003 | Widegren | |
| 6,661,780 B2 | 12/2003 | Li | |
| 6,714,515 B1 | 3/2004 | Marchand | |
| 6,718,380 B1 | 4/2004 | Mohaban et al. | |
| 6,775,267 B1 | 8/2004 | Kung | |
| 6,847,708 B1 | 1/2005 | Abbasi et al. | |
| 6,891,811 B1 | 5/2005 | Smith | |
| 6,947,531 B1 * | 9/2005 | Lewis et al. | 379/114.13 |
| 7,003,307 B1 | 2/2006 | Kupsh | |
| 7,039,037 B2 | 5/2006 | Wang | |
| 7,107,068 B2 | 9/2006 | Benzon | |
| 7,215,970 B2 | 5/2007 | Corrigan | |
| 7,269,431 B1 | 9/2007 | Gilbert | |
| 2001/0026553 A1 | 10/2001 | Gallant | |
| 2001/0053687 A1 | 12/2001 | Sivula | |
| 2001/0055291 A1 | 12/2001 | Schweitzer | |
| 2002/0052754 A1 | 5/2002 | Joyce | |
| 2002/0103925 A1 | 8/2002 | Sheth | |

(Continued)

FOREIGN PATENT DOCUMENTS

DE 10148540 A1 4/2003

(Continued)

OTHER PUBLICATIONS

Dippelhofer A, "Flexible Abrechnung", Funkschau, Weka Fachzeitschriften Verlag, Poing, DE, vol. 75, No. 1/2, Jan. 17, 2003, pp. 34-36.

(Continued)

*Primary Examiner*—Michael T Thier
(74) *Attorney, Agent, or Firm*—Perry + Currier Inc.; T. Andrew Currier; Stephen J. Perry

(57) ABSTRACT

The invention of present provides for a real-time authentication and billing gateway for WLAN traffic. Notably, the improved method for implementing a Wireless Local Area Network (WLAN) gateway system enables telecommunications network operators (and like entities) to rate and bill for services accessed by the wireless user. The logic of the invention supports and furthers the art in regards to advanced real-time rating/billing in addition to providing for a variety of replenishment mechanisms for casual users via pre-paid vouchers and credit cards.

22 Claims, 1 Drawing Sheet

U.S. PATENT DOCUMENTS

| | | | |
|---|---|---|---|
| 2002/0107754 A1 | 8/2002 | Stone | |
| 2002/0152319 A1 | 10/2002 | Amin | |
| 2002/0152321 A1 | 10/2002 | Le | |
| 2002/0176378 A1 | 11/2002 | Hamilton | |
| 2003/0003932 A1 | 1/2003 | Corrigan | |
| 2003/0009580 A1 | 1/2003 | Chen | |
| 2003/0035409 A1 | 2/2003 | Wang | |
| 2003/0051041 A1* | 3/2003 | Kalavade et al. | 709/229 |
| 2003/0069922 A1 | 4/2003 | Arunachalam | |
| 2003/0074286 A1 | 4/2003 | Rodrigo | |
| 2003/0083990 A1 | 5/2003 | Berg | |
| 2003/0096605 A1* | 5/2003 | Schlieben et al. | 455/419 |
| 2003/0105720 A1 | 6/2003 | Ishibashi | |
| 2003/0112936 A1* | 6/2003 | Brown et al. | 379/121.02 |
| 2003/0134615 A1* | 7/2003 | Takeuchi | 455/411 |
| 2003/0157925 A1* | 8/2003 | Sorber et al. | 455/406 |
| 2003/0158902 A1 | 8/2003 | Volach | |
| 2003/0187996 A1 | 10/2003 | Cardina | |
| 2003/0207686 A1 | 11/2003 | Ramanna | |
| 2003/0214958 A1 | 11/2003 | Madour | |
| 2004/0022191 A1 | 2/2004 | Bernet et al. | |
| 2004/0028055 A1 | 2/2004 | Madour | |
| 2004/0066769 A1 | 4/2004 | Ahmavaara | |
| 2004/0092250 A1 | 5/2004 | Valloppillil | |
| 2004/0095924 A1 | 5/2004 | Holur | |
| 2004/0105424 A1 | 6/2004 | Skoczkowski | |
| 2004/0117312 A1 | 6/2004 | Lialiamou | |
| 2004/0127215 A1 | 7/2004 | Shaw | |
| 2004/0236686 A1 | 11/2004 | Bohmer | |
| 2005/0100035 A1 | 5/2005 | Chiou | |
| 2005/0131984 A1 | 6/2005 | Hofmann et al. | |
| 2005/0185664 A1 | 8/2005 | Chaskar et al. | |
| 2005/0195743 A1 | 9/2005 | Rochberger | |
| 2005/0272465 A1 | 12/2005 | Ahmavaara | |
| 2006/0008063 A1* | 1/2006 | Harnesk et al. | 379/114.01 |
| 2006/0031297 A1 | 2/2006 | Zuidema | |
| 2006/0039374 A1 | 2/2006 | Belz | |
| 2006/0028980 A1 | 4/2006 | Wright | |
| 2006/0075467 A1 | 4/2006 | Sanda | |

FOREIGN PATENT DOCUMENTS

| | | |
|---|---|---|
| EP | 1026853 A1 | 8/2000 |
| EP | 1278359 A2 | 1/2003 |
| EP | 1278383 A2 | 1/2003 |
| EP | 1298599 A1 | 4/2003 |
| EP | 1309213 A1 | 5/2003 |
| EP | 1320214 A | 6/2003 |
| WO | 01/63883 A2 | 8/2001 |
| WO | 01/69891 A1 | 9/2001 |
| WO | 03032618 A | 4/2003 |
| WO | 03037023 A | 5/2003 |
| WO | 03/047164 A2 | 6/2003 |

OTHER PUBLICATIONS

Lin, Y et al., "Mobile Prepaid Phone Services", IEEE Personal Communications, Jun. 2000, pp. 6-14.

Fonknechten D et al. "Service Aware Intelligent GGSN" Alcatel Telecommunications Review, No. Q4 2003, Oct. 1, 2003, pp. 1-10.

Ganna, M. et al. "On using policies for managing services provisioning in agent-based heterogeneous environments for mobile users" Sixth IEEE International Workshop on Policies for Distributed Systems and Networks, Jun. 6-8, 2005; pp. 149-158.

Salkintzis A. et al. "Seamless multimedia QoS accross UMTS and WLANs", IEEE 61st Vehicular Technology Conference, VTC, May 30-Jun. 1, 2005, vol. 4, pp. 2284-2288.

Cheung, M. et al. "Applying a service-on-demand policy management framework to an ETTx environment", IEEE/IFIP Network Operations and Management Symposium, 2004, NOM 2004, Apr. 19-23, 2004, vol. 2, pp. 101-114.

* cited by examiner

METHOD FOR IMPLEMENTING A WIRELESS LOCAL AREA NETWORK (WLAN) GATEWAY SYSTEM

CROSS-REFERENCE TO RELATED APPLICATIONS

Patent application Ser. No. 10/348,972 entitled "Method for implementing an Internet Protocol (IP) charging and rating middleware platform and gateway system".

Patent application Ser. No. 10/307,335 entitled "Improved method for implementing an Open Charging (OC) middleware platform and gateway system".

STATEMENT REGARDING FEDERALLY SPONSORED RESEARCH OR DEVELOPMENT

Not Applicable

REFERENCE TO A MICROFICHE APPENDIX

Not Applicable

BACKGROUND ART

Wireless Local Area Network (WLAN) technology represents an ever-evolving area of the art which enables high-speed wireless access to the Internet or to a company Intranet. Given that the range of such WLAN Access Points is in the order of one hundred (100) metres, such service offerings have traditionally remained limited to discrete locales or 'hot spots' beyond the traditional workplace, as the ubiquitous coffee shop, rail stations, airports and so forth.

The prior art teachings in this area remain quite limited in light of the state of the art (and evolution beyond such). Consider, U.S. Patent Application 20020176579 by Deshpande et al., entitled Location-based services using wireless hotspot technology, which provides for a method of providing location-based services to a wireless device using a hotspot access point, comprising: establishing a connection between the wireless device and the hotspot access point; and providing information associated with the physical location of the hotspot access point to the wireless device. However, the application by Deshpande et al. restricts the billing mechanism to one of three modalities—'business', 'public' or 'personal'. The invention disclosed herein does not require a given billable service to be characterized or limited to one of the three modalities as explicitly stipulated by Deshpande et al.'s application. Furthermore, Deshpande et al. does not teach or intimate a method whereby the relevant authentication, accounting and charging information is communicated to a centralized authentication or billing server (such as those hosted by macroscopic wireless carriers). In addition, the U.S. Patent Application 20020176579 by Deshpande et al. does not teach or suggest a method whereby the location information affects the billing mechanism associated with the provision of services or capabilities to a given end-user as the case may be.

Further prior art also remain limited in its teachings. Consider U.S. Patent Application 20030051041 by Kalavade et al., according to its title provides for a method and apparatus for integrating billing and authentication functions in local area and wide area wireless data networks. However, Kalavade et al. relies on a non-repudiation scheme whereby the subscriber is required to provide some form of personal data (e.g. their name, an address, a date of birth, and one or more digits of a social security number). The invention disclosed herein does not require the use of personal data for the purpose of non-repudiation. Indeed, while the application by Kalavade et al. indicates that integration with a given 'back-office' server (an HLR) is required, the application does not teach or suggest a method whereby the authentication sequences can be mapped into an appropriate sequence supported by contemporary networks which utilize the EAP, ANSI-41, GSM MAP, RADIUS, or DIAMETER protocols as the case may be. Furthermore, the patent application does not teach or suggest a method whereby alternative methods of payment can by supported (e.g. prepaid vouchers or credit cards).

And still further, International Application 03/032618 filed under the Patent Cooperation Treaty by Melistrand et al., entitled Integration of Billing between Cellular and WLAN Networks, provides a method for integrating a cellular and wlan network for the purpose of billing via a 'Sign-up Server'. However the application by Mellstrand et al., relies on the use of the GGSN in order to communicate with the HLR for the retrieval of user information and to authenticate the user. The invention disclosed herein does not require the use of the GGSN, nor is the disclosed invention restricted to GSM/GPRS based macroscopic networks. Furthermore, Mellstrand et al.'s application does not teach or suggest a method whereby wlan charges can be accrued against prepaid accounts nor does it intimate a method whereby alternative methods of payment (e.g. prepaid vouchers or credit cards) can by supported for the purpose billing WLAN access and usage.

REFERENCES CITED:

| | | | |
|---|---|---|---|
| U.S. patent application 20030051041 | March 2003 | Kalavade et al. | 709/229 |
| U.S. patent application 20020176579 | November 2002 | Deshpande et al. | 380/270 |
| Foreign Patent Document(s) 03/032618 | April 2003 | | PCT. |

Other references:

GSM 03.40, Digital cellular telecommunications system (Phase 2+); Technical realization of the Short Message Service (SMS)
GSM 09.02, Mobile Application Part (MAP) specification
3GPP2 N.S0023, Network Support for MDN-Based Message Centers
TIA TR 45.2, IS-841, TIA/EIA-41-D Based Network Enhancements for MDN Based Message Centers
GSM 03.90, Digital cellular telecommunications system (Phase 2+); Unstructured Supplementary Service Data (USSD) - Stage 2
TIA TR 45.2, IS-841, TIA/EIA-41-D Based Network Enhancements for MDN Based Message Centers
TIA/EIA ANSI-41 Cellular Radiotelecommunications Intersystem Operations
Diameter Base Protocol - draft-ietf-aaa-diameter-17
RFC 2865 Remote Authentication Dial In User Service
RFC 2866 RADIUS Accounting

TECHNICAL FIELD

The present invention relates generally to wireless telecommunications network implementations and gateway services, and, in particular, to an improved method for implementing a Wireless Local Area Network (WLAN) gateway system.

SUMMARY OF THE INVENTION

The invention of present provides for a real-time authentication and billing gateway system for Wireless Local Area Network (WLAN) traffic. The improved method for implementing a Wireless Local Area Network (WLAN) gateway system intermediates and connects WLAN users to the wireless network in question by easily and openly integrating into existing telecommunications networks thereby capitalizing on the existing value and art found in billing, messaging, and IN platforms of present.

The improved method for implementing a Wireless Local Area Network (WLAN) gateway system disclosed herewith provides real time authentication, billing and rating for Wireless Local Area Network (WLAN) traffic and/or other such broadband data services. The invention exists as part of a computer program product which resides within the telecommunication carrier's core network. By interfacing with multiple Access Controller's (ACs) over a Remote Access Dial In User Server (RADIUS), DIAMETER, or LDAP interface, WLAN users can gain network access from telecommunications network carrier controlled hot spots and partnered hot spot providers. By acting as a gateway between wireless LAN hot spots and the telecommunications carrier's IN infrastructure the improved method for implementing a Wireless Local Area Network (WLAN) gateway system has been articulated with the necessary logic and art to facilitate the billing of existing wireless prepaid and postpaid accounts. In further landmark embodiments, wireless users, within the appropriate coverage area, who do not have GSM accounts are able to utilize the improved method for implementing a Wireless Local Area Network (WLAN) gateway system as articulated and employed within a telecommunications carrier's network, through the creation of temporary accounts via credit card, voucher or similar means.

In additional embodiments the improved method for implementing a Wireless Local Area Network (WLAN) gateway system supports a variety of account replenishment mechanisms for wireless users via pre-paid vouchers, credit-cards and other such means.

DETAILED DESCRIPTION OF THE PREFERRED EMBODIMENTS

Figure 1:
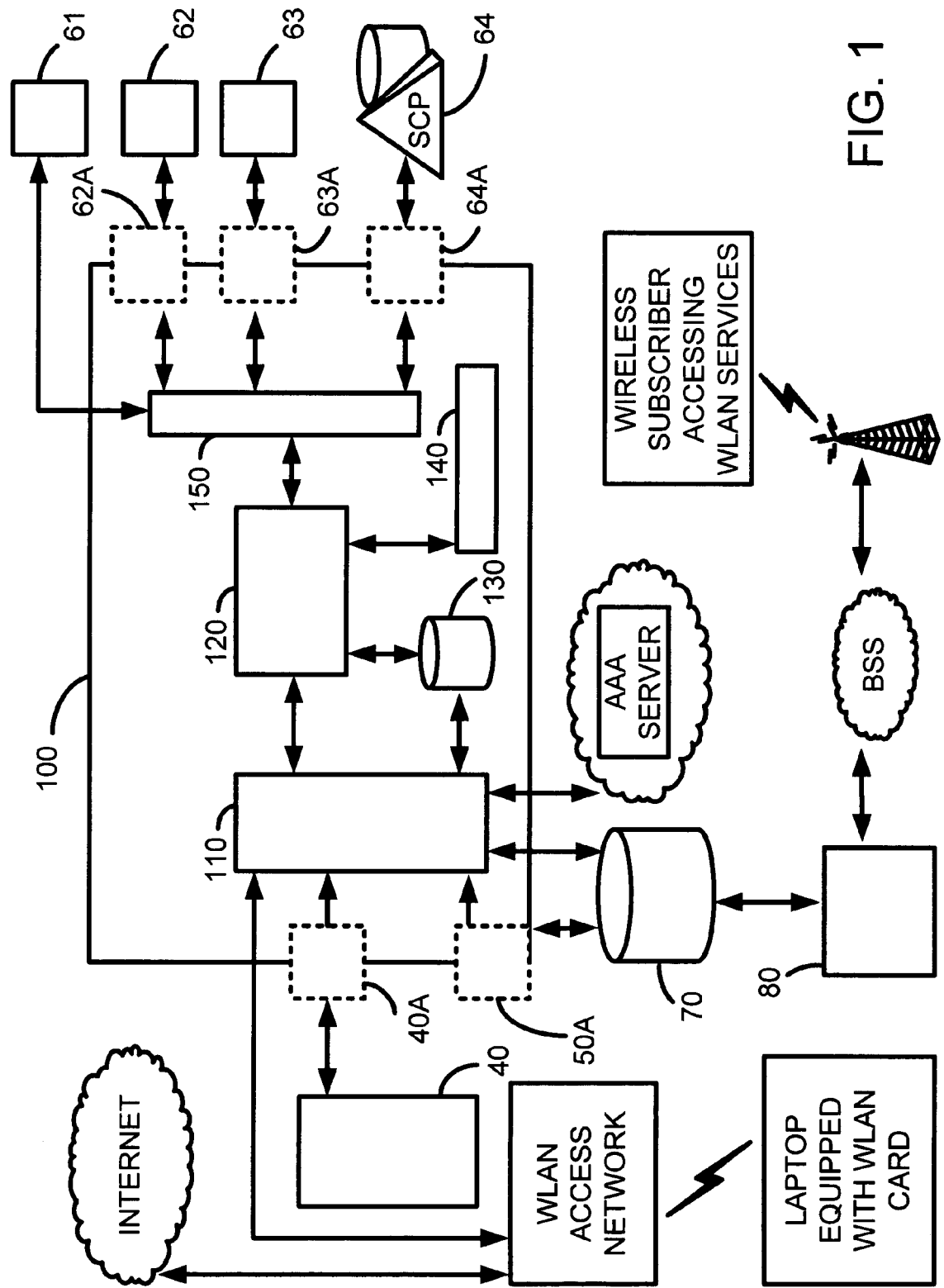
FIG. 1 illustrates a typical, non-limiting embodiment of the system level architecture employed in the disclosure of present.

With reference to FIG. 1, although the invention of present exists as part of a computer program product, for the purposes of simplicity and ease of instruction, the improved method for implementing a Wireless Local Area Network (WLAN) gateway system 100 can be functionally divided between an AAA gateway 110 and a Session Controller 120 together with Charging 150 and Rating elements 140.

Continuing with reference to FIG. 1, in the preferred embodiment, the improved method for implementing a Wireless Local Area Network (WLAN) gateway system 100 behaves as an AAA server to the Access Controller (not shown) via mediation of AAA requests typically executed through the defacto standard RADIUS protocol. Practitioners and other honourable members skilled in the art will recognize that a variety of protocols (for example, DIAMETER and LDAP) and like logical instructions may be employed without diluting the intent and scope of the invention of present, and its inclusion herewith serves merely for the purpose of elucidation, simplicity and ease of instruction.

Still with reference to FIG. 1, the improved method for implementing a Wireless Local Area Network (WLAN) gateway system connects to the SMSC 40 using the Short Message Peer-to-Peer (SMPP) protocol and interface. (The SMPP interface 40A is required for WLAN non-repudiation for subscribers). Following subscriber authentication an SMS message is delivered to the subscriber's MSISDN over SMPP and through the SMSC 40. If a reply message is received from the subscriber, WLAN service will be offered to the subscriber. If no reply is received within a configurable interval, then WLAN service is not provided to the subscriber. Practitioners and other honourable members skilled in the art will recognize that a variety of protocols and like logical instructions may be employed apart from SMPP without diluting the intent and scope of the invention of present, and its inclusion herewith serves merely for the purpose of elucidation, simplicity and ease of instruction.

Where relevant, access to the computer program product which implements the improved method for implementing a Wireless Local Area Network (WLAN) gateway system 100 can be accessed through an Unstructured Supplementary Service Data (USSD) Gateway 50A and related USSD access technologies (which remains well defined in the art including GSM 09.02 and GSM 03.90). In light of the state of the art, USSD is utilized as an optional interface instead of SMPP for non-repudiation purposes.

Those skilled in the art will recognize that SMS or USSD messaging mechanisms may also be used as a mechanism to modify subscriber preferences. The invention will also permit subscribers and network operators to make configuration changes via a (web-based) provisioning interface.

The authentication mechanisms referred to utilize SMS non-repudiation and blacklist functionalities, which are meshed to provide the said authenticating mechanism for typical subscriber access in a provisionless mode. The dual mechanisms ensure a secure system to all fraud potentialities (aside from the regrettable theft of the mobile unit itself. Although in anticipating such eventualities, mobile unit theft could be handled via real-time barring using the blacklist functionality. Nonetheless, SMS non-repudiation ensured that the intended subscriber was, in fact, the subscriber outlined with the handset contract. Blacklist functionality provides for the barring of service for criteria such as other carrier subscribers, theft, fraud, and so on.

The improved method for implementing a Wireless Local Area Network (WLAN) gateway system, which mechanically exists as part of a computer program product, supports a variety of state of the art billing constructs which are reliant on the type of access mechanism utilized by the wireless user. The charging engine 150 provides superior flexibility and allows the telecommunications carrier to offer a variety of billing mechanisms to their wireless user base.

In further elucidating the art pertaining to WLAN billing, the logic of the improved method for implementing a Wireless Local Area Network (WLAN) gateway system 100 has been refined and articulated to support a number of scenarios/constructs; including, but not limited to, contract subscribers, voucher management system, credit card services and prepaid subscribers. The listed scenarios/constructs shall be outlined further, to facilitate ease of instruction, although practitioners skilled in the subject matter will recognize that the billing scenarios remain only bounded by the state of the art.

For contract subscribers, after said subscribers have authenticated with the computer program product which implements the improved method for implementing a Wireless Local Area Network (WLAN) gateway system 100, the former invention tracks charges based on the subscriber rate plan (pre-defined). Said billing details are laid out in a telecommunications carrier-defined or otherwise flexibly defined Charging Detail Record (CDR). The CDR is then sent out/ collected by downstream billing mechanisms 61 in a format compatible with the requisite art of said billing technologies.

For voucher access, the wireless user in question enters their voucher as user id and thereafter, a temporary password. Through an optional interface 63A (in a varying embodiment), the improved method for implementing a Wireless Local Area Network (WLAN) gateway system 100 validates the voucher through a voucher management system 63 (which remains well defined in the existing state of the art) and creates a WLAN session with said duration dependant upon the voucher amount and the given rate plan. The WLAN Session Controller 120 stores the available balance and periodically decrements as such. In advancing the art and in promoting its use thereof, voucher sessions support mobility. That is to say, a wireless user may enter a hotel and purchase a voucher for two (2) hours worth of use and subsequently only use one (1) therewith and log off. Said wireless user could then venture to a WLAN active airport, log back in with the voucher id and temporary password they chose and utilize the remaining hour. In alternate embodiments, the vouchers can be articulated as to expire within a certain time frame if not used to their exhaustion.

Now, where a credit card is used as the means of payment 62 (62A represents the interface), the logic internal to the improved method for implementing a Wireless Local Area Network (WLAN) gateway system 100 initially validates the credit card purchase of a set amount of time, and returns a correlation id to the user. In deference to the need to maintain credit card privacy and security, the invention does not store any credit card parameters locally. Credit card users retain comparable benefits and advantages as that of the former voucher user. (Said credit card user can log back in using the returned correlation id and temporary password they selected for their initial access).

Prepaid subscribers are billed via SCP account decrementing 64 (64A represents the interface) (which remains well defined in the art). Prior to authenticating, the logic and computer program product which implements the invention disclosed ensures that a sufficient balance exists and continues decrementing the SCP account 64 (said periodicity and amount of the account decrement is dependent on the used rate plan and billing interval settings) until the subscriber disconnects or the balance expires. In the latter scenario, the invention kills the session. To facilitate real-time SCP account debiting, the functionality associated with the improved method for implementing an Open Charging (OC) middleware platform and gateway system as detailed in patent application Ser. No. 10/307,335 is required to perform the necessary Prepaid charging functionality. Technicians skilled in the art will recognize that the invention of present need not be limited to the aforementioned Open Charging (OC) middleware platform and gateway system and other similar network implementations may be employed without diluting the intent and scope as such.

The improved method for implementing a Wireless Local Area Network (WLAN) gateway system may also be co-articulated and implemented with the method for implementing an Internet Protocol (IP) charging and rating middleware platform and gateway system as detailed in patent application Ser. No. 10/348,972, to enhance the packet/data rating and classification mechanisms inherent in the invention disclosed hereto. Technicians skilled in the art will recognize that the invention of present need not be limited to the aforementioned method for implementing an Internet Protocol (IP) charging and rating middleware platform and gateway system and other similar network implementations may be employed without diluting the intent and scope as such.

Optional manifestations of the invention may authenticate the subscriber using the authentication sequences prescribed in ANSI-41, GSM TS 09.02, ETSI TS 100 974, and 3GPP TS 29.002 Mobile Application Part (MAP) specifications as amended from time to time. Those skilled in the art will recognize that International Mobile Subscriber Identity (IMSI) and alternative Mobile Station identifiers as well as subscriber Authentication parametric attributes retrieved from the Access Controller (not shown) may be used to initiate an authentication sequence with the HLR 70 and/or Authentication Center (not shown). Yet an alternative manifestation may leverage an alternative messaging sequence (for example, Send_Routing_Info_for_SM or SMS_Request for GSM and ANSI-41 based networks respectively) to confirm whether a given subscriber has an active subscription with a given network operator. Those skilled in the art will recognize that the messaging sequence messages may be used to correlate the location of the subscriber as inferred in the response message with the location of the subscriber as provided in the RADIUS based messages which emanate from the Access Controller (not shown).

What is claimed is:

1. In a wireless local area network (WLAN) gateway system comprising:
    an access gateway connected to a server;
    a session controller connected to said access gateway;
    a charging element connected to said session controller; said charging element maintaining charging details associated with a mobile handset;
    a rating element connected to said session controller; said rating element maintaining rating profile information associated with said mobile handset;
    an interface connected to said access gateway for connecting said mobile handset to said access gateway via said interface;
    a computing device connected to said access gateway via a WLAN access network;
    a method for providing access to said server from said computing device comprising:
        receiving at said access gateway authentication information for a subscriber associated with said computing device;
        sending a first message from said access gateway to said mobile handset; and,
        if no reply to said first message is received within a configurable interval from said subscriber then denying said computing device access to said server; and
        if a reply to said first message is received, then permitting said computing device to access said server and, during said access;
        sending an instruction from said access gateway to said rating element, to determine a rate for packets carried between said computing device and said WLAN access network to establish a rate of charge for each of said packets according to a different classification assigned to each of said packets; and
        sending an instruction from said access gateway to said charging element representing charging details associated with the access of said server by said computing device; said charging details based on said rate.

2. The method of claim 1 wherein said access gateway is an authentication, authorization and accounting gateway.

3. The method of claim 2 wherein said gateway is an AAA server.

4. The method of claim 1 wherein said MAN system further comprises a messaging interface connected to said access gateway and wherein said messaging interface is a short message peer-to-peer ("SMPP") interface configured to send and receive instructions to and from said mobile handset for modifying at least one of subscriber preferences respective to said rate of charge and sending information concerning the subscriber's identity for the purpose of non-repudiation.

5. The method of claim 1, wherein said first message is a short message ("SM") configured to send information concerning an identity of said subscriber for the purpose of non-repudiation.

6. The method of claim 1, wherein said WLAN system further comprises a messaging interface connected to said access gateway and wherein said messaging interface is an unstructured supplementary service data (USSD) gateway configured to send and receive instructions from said mobile handset for at least one of modifying subscriber preferences to said rate of charge and sending information concerning the subscriber's identity for the purpose of non-repudiation.

7. The method of claim 6 wherein said mobile handset accesses said (USSD) gateway via a home location register.

8. The method of claim 1 further comprising the step of receiving one or more additional messages from said handset at said access gateway; said additional messages including instructions to modify subscriber preferences associated with said access of said server via said gateway.

9. The method of claim 1 wherein said charging details include incrementing a charge associated with charging detail record (CDR).

10. The method of claim 1 wherein said charging details include decrementing a voucher balance.

11. The method of claim 1 wherein said charging details include decrementing a credit card balance.

12. A wireless local area network (WLAN) gateway system, comprising:
an access gateway connected to a server;
a session controller connected to said access gateway;
a charging element connected to said session controller; said charging element maintaining charging details associated with a mobile handset;
a rating element connected to said session controller; said rating element maintaining rating profile information associated with said mobile handset;
an interface connected to said access gateway for connecting a mobile handset to said access gateway via said interface;
a computing device connected to said access gateway via a WLAN access network;
said system configured to perform a method for providing access to said server from said computing device comprising:
receiving at said access gateway authentication information for a subscriber associated with said computing device;
sending a first message from said access gateway to said mobile handset; and,
if no reply to said first message is received within a configurable interval from said subscriber then denying said computing device access to said server; and
if a reply to said first message is received, then permitting said computing device to access said server; and, during said access;
sending an instruction from said access gateway to said rating element to determine a rate for packets carried between said computing device and said WLAN access network to establish a rate of charge for each of said packets according to a different classification assigned to each of said packets; and
sending an instruction from said access gateway to said charging element representing charging details associated with the access of said server by said computing device; said charging details based on said rate.

13. The system of claim 12 wherein said access gateway is an authentication, authorization and accounting gateway.

14. The system of claim 13 wherein said gateway is an AAA server.

15. The system of claim 12, wherein said WLAN system further comprises a messaging interface connected to said access gateway and wherein said messaging interface is a short message peer-to-peer ("SMPP") interface configured to send and receive instructions to and from said mobile handset for at least one of modifying subscriber preferences respective to said rate of charge and sending information concerning the subscriber's identity for the purpose of non-repudiation.

16. The system of claim 15 wherein said first message is a short message ("SM") configured to send information concerning an identity of said subscriber for the purpose of non-repudiation.

17. The system of claim 12 wherein said WLAN system further comprises a messaging interface connected to said access gateway and wherein said messaging interface is an unstructured supplementary service data (USSD) gateway configured to send and receive instructions from said mobile handset for at least one of modifying subscriber preferences to said rate of charge and sending information concerning the subscriber's identity for the purpose of non-repudiation.

18. The system of claim 17 wherein said mobile handset accesses said (USSD) gateway via a home location register.

19. The system of claim 12 further comprising the step of receiving one or more additional messages from said handset at said access gateway; said additional messages including instructions to modify subscriber preferences associated with said access of said server via said gateway.

20. The system of claim 12 wherein said charging details include incrementing a charge associated with charging detail record (CDR).

21. The system of claim 12 wherein said charging details include decrementing a voucher balance.

22. The system of claim 12 wherein said charging details include decrementing a credit card balance.

* * * * *